United States Patent
Dooley (10) Patent No.: US 9,683,130 B2
(45) Date of Patent: Jun. 20, 2017

(54) POLYDIPHENYLSILOXANE COATING FORMULATION AND METHOD FOR FORMING A COATING

(71) Applicant: Xerox Corporation, Norwalk, CT (US)

(72) Inventor: Brynn Dooley, Toronto (CA)

(73) Assignee: XEROX CORPORATION, Norwalk, CT (US)

( * ) Notice: Subject to any disclaimer, the term of this patent is extended or adjusted under 35 U.S.C. 154(b) by 441 days.

(21) Appl. No.: 14/219,653

(22) Filed: Mar. 19, 2014

(65) Prior Publication Data
US 2015/0267078 A1  Sep. 24, 2015

(51) Int. Cl.
C09D 183/04 (2006.01)

(52) U.S. Cl.
CPC ..... *C09D 183/04* (2013.01); *Y10T 428/31663* (2015.04)

(58) Field of Classification Search
CPC .................................................. C09D 183/04
See application file for complete search history.

(56) References Cited

U.S. PATENT DOCUMENTS

| | | |
|---|---|---|
| 4,339,553 A | 7/1982 | Yoshimura et al. |
| 4,970,098 A | 11/1990 | Ayala-Esquilin et al. |
| 4,997,642 A | 3/1991 | Curtis et al. |
| 5,145,518 A | 9/1992 | Winnik et al. |
| 5,146,087 A | 9/1992 | Vandusen |
| 5,202,265 A | 4/1993 | LaMora |
| 5,208,630 A | 5/1993 | Goodbrand et al. |
| 5,225,900 A | 7/1993 | Wright |
| 5,231,135 A | 7/1993 | Machell et al. |
| 5,256,193 A | 10/1993 | Winnik et al. |
| 5,271,764 A | 12/1993 | Winnik et al. |
| 5,275,647 A | 1/1994 | Winnik |
| 5,286,286 A | 2/1994 | Winnik et al. |
| 5,301,044 A | 4/1994 | Wright |
| 5,378,574 A | 1/1995 | Winnik et al. |
| 5,385,803 A | 1/1995 | Duff et al. |
| 5,464,703 A | 11/1995 | Ferrar et al. |

(Continued)

FOREIGN PATENT DOCUMENTS

| | | |
|---|---|---|
| EP | 1900527 A1 | 3/2008 |
| EP | 2228690 A1 | 9/2010 |
| WO | 2005047385 A1 | 5/2005 |

OTHER PUBLICATIONS

Bruce E Kahn, "The M3D Aerosol Jet System, An Alternative to Inkjet Printing for Printed Electronics", Organic and Printed Electronics, vol. 1, Issue 1, Winter 2007, pp. 14-17.

(Continued)

*Primary Examiner* — Catherine S Branch
(74) *Attorney, Agent, or Firm* — MH2 Technology Law Group LLP (57) ABSTRACT

Provided is composition for a liquid coating. The composition may include a silanol terminated copolymer, at least one cross-linker, and a catalyst. The silanol terminated copolymer may include from about 10 to about 25 mol % of a diphenylsiloxane repeat unit and greater than about 50 mol % of a dialkylsiloxane repeat unit. The at least one cross-linker may be one or more selected from: tetraethoxysilane (TEOS), a trialkoxysilane terminated polydialkylsiloxane and/or one or more of a trialkoxysilyl terminated polymer.

7 Claims, 4 Drawing Sheets

(56) References Cited

U.S. PATENT DOCUMENTS

| | | |
|---|---|---|
| 5,474,852 A | 12/1995 | Fitzgerald et al. |
| 5,494,702 A | 2/1996 | Blaine et al. |
| 5,539,038 A | 7/1996 | Katsen et al. |
| 5,543,177 A | 8/1996 | Morrison et al. |
| 5,547,759 A | 8/1996 | Chen et al. |
| 5,554,480 A | 9/1996 | Patel et al. |
| 5,593,807 A | 1/1997 | Sacripante et al. |
| 5,621,022 A | 4/1997 | Jaeger et al. |
| 5,629,416 A | 5/1997 | Neigel et al. |
| 5,695,878 A | 12/1997 | Badesha et al. |
| 5,700,568 A | 12/1997 | Badesha et al. |
| 5,736,520 A | 4/1998 | Bey et al. |
| 5,744,200 A | 4/1998 | Badesha et al. |
| 5,750,204 A | 5/1998 | Badesha et al. |
| 5,753,307 A | 5/1998 | Badesha et al. |
| 5,808,645 A | 9/1998 | Reeves et al. |
| 5,841,456 A | 11/1998 | Takei et al. |
| 5,945,245 A | 8/1999 | Mychajlowskij et al. |
| 6,020,300 A | 2/2000 | Tcheou et al. |
| 6,042,227 A | 3/2000 | Meinhardt et al. |
| 6,051,562 A | 4/2000 | Chamberlain et al. |
| 6,103,815 A | 8/2000 | Mammino et al. |
| 6,156,858 A | 12/2000 | Keoshkerian et al. |
| 6,221,137 B1 | 4/2001 | King et al. |
| 6,348,509 B1 | 2/2002 | Reeve |
| 6,586,100 B1 | 7/2003 | Pickering et al. |
| 7,172,276 B2 | 2/2007 | Breton et al. |
| 7,202,883 B2 | 4/2007 | Breton et al. |
| 7,281,790 B2 | 10/2007 | Mouri et al. |
| 7,294,377 B2 | 11/2007 | Gervasi et al. |
| 7,374,812 B2 | 5/2008 | Mizuno |
| 7,608,325 B2 | 10/2009 | Rasch et al. |
| 7,767,011 B2 | 8/2010 | Bedford et al. |
| 7,780,286 B2 | 8/2010 | Yahiro |
| 8,038,284 B2 | 10/2011 | Hori et al. |
| 8,136,936 B2 | 3/2012 | Hook et al. |
| 8,142,557 B2 | 3/2012 | Belelie et al. |
| 8,215,762 B2 | 7/2012 | Ageishi |
| 8,247,066 B2 | 8/2012 | Wu |
| 8,268,399 B2 | 9/2012 | Gervasi et al. |
| 8,350,879 B2 | 1/2013 | Larson et al. |
| 8,500,269 B2 | 8/2013 | Morita |
| 8,919,252 B2 | 12/2014 | Lestrange et al. |
| 9,011,594 B1 | 4/2015 | Kanungo et al. |
| 9,022,546 B1 | 5/2015 | Breton et al. |
| 9,126,430 B2 | 9/2015 | Liu |
| 9,138,985 B1 | 9/2015 | Yang et al. |
| 9,174,432 B2 | 11/2015 | Liu et al. |
| 9,187,587 B2 | 11/2015 | Kanungo et al. |
| 9,193,209 B2 | 11/2015 | Dooley et al. |
| 9,211,697 B2 | 12/2015 | Dooley et al. |
| 9,227,393 B2 | 1/2016 | Song et al. |
| 9,273,218 B2 | 3/2016 | Liu |
| 9,284,469 B2 | 3/2016 | Song et al. |
| 9,303,135 B2 | 4/2016 | Eliyahu et al. |
| 9,303,185 B2 | 4/2016 | Sambhy et al. |
| 9,327,519 B1 | 5/2016 | Larson et al. |
| 9,353,290 B2 | 5/2016 | Condello et al. |
| 2002/0064648 A1 | 5/2002 | Schlueter et al. |
| 2003/0067528 A1 | 4/2003 | Chowdry et al. |
| 2003/0233952 A1 | 12/2003 | Pan et al. |
| 2003/0233953 A1 | 12/2003 | Pan et al. |
| 2003/0234840 A1 | 12/2003 | Pan et al. |
| 2004/0158056 A1 | 8/2004 | Hiemstra et al. |
| 2004/0253436 A1 | 12/2004 | Heeks et al. |
| 2005/0018027 A1 | 1/2005 | Pan et al. |
| 2006/0008599 A1 | 1/2006 | Hiyama |
| 2006/0105117 A1 | 5/2006 | Kim et al. |
| 2006/0147659 A1 | 7/2006 | Foley |
| 2006/0152566 A1 | 7/2006 | Taniuchi et al. |
| 2007/0207186 A1 | 9/2007 | Scanlon et al. |
| 2007/0207269 A1 | 9/2007 | Woodhall et al. |
| 2007/0266896 A1* | 11/2007 | Suwa ............... C09D 5/006 106/287.16 |
| 2008/0032072 A1 | 2/2008 | Taniuchi et al. |
| 2008/0055381 A1 | 3/2008 | Doi et al. |
| 2008/0206571 A1 | 8/2008 | Berckmans et al. |
| 2009/0110942 A1 | 4/2009 | Henderson-Rutgers et al. |
| 2009/0152664 A1 | 6/2009 | Klem et al. |
| 2009/0195579 A1 | 8/2009 | Tousi et al. |
| 2009/0237479 A1 | 9/2009 | Yamashita et al. |
| 2011/0018925 A1 | 1/2011 | Ohara |
| 2011/0025752 A1 | 2/2011 | Law et al. |
| 2011/0122195 A1 | 5/2011 | Kovacs et al. |
| 2011/0122210 A1 | 5/2011 | Sambhy et al. |
| 2011/0269849 A1 | 11/2011 | Yao et al. |
| 2012/0039648 A1 | 2/2012 | Sambhy et al. |
| 2012/0042518 A1 | 2/2012 | Law et al. |
| 2012/0083530 A1 | 4/2012 | Mai et al. |
| 2012/0103212 A1 | 5/2012 | Stowe et al. |
| 2012/0121827 A1 | 5/2012 | Baird et al. |
| 2012/0135650 A1 | 5/2012 | Servante et al. |
| 2012/0140009 A1 | 6/2012 | Kanasugi et al. |
| 2012/0162312 A1 | 6/2012 | Ahl et al. |
| 2012/0251685 A1 | 10/2012 | Wang-Nolan et al. |
| 2012/0274914 A1 | 11/2012 | Stowe et al. |
| 2012/0283098 A1 | 11/2012 | Zhang et al. |
| 2012/0301818 A1 | 11/2012 | Gilmartin et al. |
| 2013/0266803 A1 | 10/2013 | Dooley et al. |
| 2013/0272763 A1 | 10/2013 | Moorlag et al. |
| 2014/0060352 A1 | 3/2014 | Gervasi et al. |
| 2014/0060357 A1 | 3/2014 | Hsieh |
| 2014/0060359 A1 | 3/2014 | Kanungo et al. |
| 2014/0060360 A1 | 3/2014 | Moorlag et al. |
| 2014/0060361 A1 | 3/2014 | Gervasi et al. |
| 2014/0060363 A1 | 3/2014 | Kelly et al. |
| 2014/0060365 A1 | 3/2014 | Gervasi et al. |
| 2014/0154377 A1 | 6/2014 | Wang-Nolan et al. |
| 2014/0168330 A1 | 6/2014 | Liu et al. |
| 2014/0307800 A1 | 10/2014 | Sole Rojals et al. |
| 2015/0004861 A1 | 1/2015 | Gervasi et al. |
| 2015/0022602 A1 | 1/2015 | Landa et al. |
| 2015/0031806 A1* | 1/2015 | Lim ............... C08L 75/04 524/114 |
| 2015/0085036 A1 | 3/2015 | Liu |
| 2015/0085039 A1 | 3/2015 | Liu |
| 2015/0116414 A1 | 4/2015 | Eliyahu et al. |
| 2015/0119510 A1 | 4/2015 | Eliyahu et al. |
| 2015/0165758 A1 | 6/2015 | Sambhy et al. |
| 2015/0258778 A1 | 9/2015 | Dooley et al. |
| 2015/0267078 A1 | 9/2015 | Dooley |
| 2015/0275022 A1 | 10/2015 | Chen et al. |
| 2015/0291847 A1 | 10/2015 | Condello et al. |
| 2015/0315403 A1 | 11/2015 | Song et al. |
| 2015/0315409 A1 | 11/2015 | Song et al. |
| 2015/0343797 A1 | 12/2015 | Song et al. |
| 2016/0083606 A1 | 3/2016 | Sisler et al. |
| 2016/0083607 A1 | 3/2016 | Sisler et al. |
| 2016/0083609 A1 | 3/2016 | Sisler et al. |
| 2016/0083636 A1 | 3/2016 | Yoshida et al. |
| 2016/0089875 A1 | 3/2016 | Song et al. |
| 2016/0176185 A1 | 6/2016 | Kanungo et al. |
| 2016/0280949 A1 | 9/2016 | Song et al. |
| 2016/0326376 A1 | 11/2016 | Song et al. |
| 2017/0015115 A1 | 1/2017 | Chen et al. |
| 2017/0051155 A1 | 2/2017 | Larson et al. |

OTHER PUBLICATIONS

Jikei et al. "Synthesis and Properties of Hyperbranched Aromatic Polyamide Copolymers from AB and AB2 Monomers by Direct Polycondensation", Macromolecules 2000, 33, pp. 6228-6234 (2000).

Author Unknown, BYK-Silclean 3700 by BYK Chemie, http://www.specialchem4coatings.com/tds/byk-silclean-3700/byk-chemie/10414/index.aspx?q=Byk%20Silclean%203700, 2013, 1 page.

Author Unknown, Desmodur N 3790 BA, Bayer MaterialScience, LLC., http://www.bayermaterialsciencenafta.com/products/index.cfm?mode=lit&pp_num=EB7C52DD-F4EC-BDA1-6BE0225FEE5C1FD0&pg_num=EB7C5520-9065-98A0-5A4CD71113D57191&pf=0&pf=1, 2007, 1 page.

(56) References Cited

OTHER PUBLICATIONS

Law et al., "Self Cleaning Polymers and Surfaces", TechConnect World Conference & Expo, Jun. 13-16, 2011, abstract of presentation, 1 page.
Author Unknown, "Products and Properties: Desmodur/Desmophen for Coatings, Commerical Products", Bayer MaterialScience AG brochure, Edition: 2005-07 E, 28 pages.
Dow, Product Safety Assessment, TRITON CF Series Surfactants, Dec. 16, 2012, 6 pages.
Wikipedia, Hydrocarbon, Downloaded Mar. 2, 2016, 8 pages.
Reddy et al., "Citric acid cross-linking of starch films," University of Nebraska—Lincoln, Faculty Publications—Textiles, Merchandising and Fashion Design, Paper 25, 2009, pp. 702-711.
Wikipedia, "Tricarboxylic Acid," 2 pages printed on Aug. 19, 2015.
Wikipedia, "Dicarboxylic Acid," 7 pages printed on Aug. 19, 2015.
Wikipedia, "Tetracarboxylic acids", 2 pages printed on Aug. 19, 2015, https://commons.wikimedia.org/wiki/Category:Tetracarboxylic_acids.
Berset 2185, Technical Data Sheet, Mar. 14, 2012, 2 pages.
Wang et al., "Preparation of a Crosslinking Cassava Starch Adhesive and its Application in Coating Paper", BioResources, 2013, 8 (3), pp. 3574-3589.
Philipp, et al., "Three Methods for In Situ Cross-Linking of Polyvinyl Alcohol Films for Application as Ion-Conducting Membranes in Potassium Hydroxide Electrolyte", NASA, Apr. 1979,18 pages.
Song, "Starch crosslinking for cellulose fiber modification and starch nanoparticle formation", https://smarttech.gatech.edu/handle/1853/39524?show=full, downloaded Jan. 22, 2015, 4 pages.
Brynn Dooley et al., "Transfix Surface Member Coating", U.S. Appl. No. 14/219,481, filed Mar. 19, 2014.
Brynn Dooley et al., "Aqueous Ink Jet Blanket", U.S. Appl. No. 14/203,667, filed Mar. 11, 2014.
"Dimer Acids," Kirk-Othmer Encyclopedia of Chemical Technology, vol. 8, 4th Ed. (1992), pp. 223-237.
Author Unknown, "Chemical reactions on the "finished" silicone", Silicones Europe, http://www.silicones.eu/science-research/chemistry/chemical-reactions-on-the-finished-silicone, accessed Dec. 13, 2014, pp. 1-4.
Bruce E. Kahn, "The M3D Aerosol Jet System, An Alternative to Inkjet Printing for Printed Electronics", Organic and Printed Electronics, vol. 1, Issue 1, Winter 2007, pp. 14-17.
Song, et al., "Compositions and Use of Compositions in Printing Processes", U.S. Appl. No. 14/502,202, filed Sep. 30, 2014.
Kanungo, et al., "Multilayer Imaging Blanket Coating", U.S. Appl. No. 14/576,734, filed Dec. 19, 2014.
Song, et al., "Sacrificial Coating and Indirect Printing Apparatus Employing Sacrificial Coating on Intermediate Transfer Member", U.S. Appl. No. 14/665,319, filed Mar. 23, 2015.
Larson, et al., "Sacrificial Coating and Indirect Printing Apparatus Employing Sacrificial Coating on Intermediate Transfer Member", U.S. Appl. No. 14/830,557, filed Aug. 19, 2015.
Larson, et al., "Sacrificial Coating and Indirect Printing Apparatus Employing Sacrificial Coating on Intermediate Transfer Member", U.S. Appl. No. 14/867,864, filed Sep. 28, 2015.
http://www2.dupont.com/Elvanol/en_US/assets/downloads/elvanol_51_05.pdf, 2006.
Dow, DOW Surfactants, http://www.dow.com/surfacants/products/second.htm, retrieved Mar. 10, 2014, pp. 1-2.
Dow, Material Safety Data Sheet, Tergitol(TM) TMN-6 (90% AQ), The Dow Chemical Company, Feb. 12, 2003, pp. 1-15.
Author Unknown, "Dot Tool", Quality Engineering Associates, Inc., pp. 1-3, May 9, 2016.
Cabot, "Specialty Carbon Blacks for Ultraviolet Protection & Weatherability", Cabot Corporation, 2 pages. Jun. 28, 2015.
Ming-Kai Tse, "PIAS-II™—A Hig-performance Portable tool for Print Quality Analysis Anytime, Anywhere", Quality Engineering Associates (QEA), Inc. pp. 1-4, Jun. 2007.
Sisler, Gordon et al., Method of Making Sacrificial Coating for an Intermediate Transfer Member of Indirect Printing Apparatus, U.S. Appl. No. 15/421,929, filed Feb. 1, 2017.
Sisler, Gordon et al. "Sacrificial Coating for Intermediate Transfer Member of an Indirect Printing Apparatus", U.S. Appl. No. 15/369,962, filed Dec. 6, 2016.
Sisler, Gordon et al. "Sacrificial Coating for Intermediate Transfer Member of an Indirect Printing Apparatus", U.S. Appl. No. 15/410,050, filed Jan. 19, 2017.

* cited by examiner

POLYDIPHENYLSILOXANE COATING FORMULATION AND METHOD FOR FORMING A COATING

TECHNICAL FIELD

Embodiments described herein relate generally to printers, particularly a transfix blanket in a printer, and specifically to a method and composition that improves properties of transfix blankets.

BACKGROUND

In indirect aqueous printing, an aqueous ink is transported from an ink discharge port onto various intermediate media (e.g., transfer belts, intermediate blankets or drums) that may be used to transfer the formed image to the final substrate such as textiles, rubber and the like. For example, in intermediate transfix processes, aqueous latex ink is ink jetted onto an intermediate blanket where the ink film is dried with heat. To avoid disturbing the semi-wet ink, non-contact heating is employed to dry the ink. The dried image is subsequently transfixed on to the final paper substrate. For this process to properly operate, the intermediate blanket has to satisfy two conflicting requirements— the first requirement is that ink has to spread well on the blanket and the second requirement is that, after drying, the ink should release from the blanket. Accordingly, intermediate blankets may utilize specially engineered topcoat materials. However, materials that exhibit high thermal stability and moderate wettability (e.g., not as difficult to wet as silicone or fluorinated materials), yet still exhibit non-stick or anti-contaminant properties, are virtually non-existent.

Thus, to address the above problems faced in transfix processes, there is a need for a material that may be employed as a blanket topcoat and provides transfix blankets with desired wettability and adequate spreading of aqueous inks, while providing thermal stability and anti-contaminant properties.

SUMMARY

In an embodiment, there is a composition. The composition may be a liquid and may be used for forming a liquid coating. The composition may include a silanol terminated copolymer, at least one cross-linker, and a catalyst. The silanol terminated copolymer may include from about 10 to about 25 mol % of a diphenylsiloxane repeat unit and greater than about 50 mol % of a dialkylsiloxane repeat unit. The at least one cross-linker may be one or more selected from the group consisting of tetraethoxysilane (TEOS), a trialkoxysilane terminated polydialkylsiloxane and/or one or more of a a trialkoxysilyl terminated polymer.

In another embodiment there is a coating method. The method may include, forming a liquid coating composition on a substrate and forming a cured coating by curing the liquid coating composition at a temperature in the range of 80° C. to about 150° C. The liquid coating composition can include a silanol terminated copolymer, at least one cross-linker, and a catalyst. The at least one crosslinker may be one or more selected from the group consisting of tetraethoxysilane (TEOS), a trialkoxysilane terminated polydialkylsiloxane and/or one or more of a trialkoxysilyl terminated polymer. The catalyst may be about 0.1 wt % to about 5 wt % of the liquid coating composition. The catalyst may be at least one of titanate, zirconate and/or tin. The silanol terminated copolymer may include from about 10 to about 25 mol % of a diphenylsiloxane repeat unit and greater than about 50 mol % of a dialkylsiloxane repeat unit.

The silanol terminated siloxane copolymer may be represented by:

where R may be a linear, branched, or cyclic saturated or unsaturated alkyl group containing from about 1 to 30 carbon atoms, s may be from about 1 to about 500, and t may be from about 1 to about 300.

In yet another embodiment, there is a transfix blanket for a printer. The transfix blanket may include a substrate layer and a topcoat layer disposed on the substrate layer. The topcoat layer may include a silanol terminated copolymer crosslinked with at least one cross-linker. The at least one crosslinker may be one or more selected from the group consisting of tetraethoxysilane (TEOS), a trialkoxysilane terminated polydialkylsiloxane and/or one or more of a trialkoxysilyl terminated polymer. The silanol terminated copolymer may include from about 10 to about 25 mol % of a diphenylsiloxane repeat unit and greater than about 50 mol % of a dialkylsiloxane repeat unit. The silanol terminated siloxane copolymer may be represented by:

wherein R may be a linear, branched, or cyclic saturated or unsaturated alkyl group containing from about 1 to 30 carbon atoms, s may be from about 1 to about 500, and t may be from about 1 to about 300.

Advantages can include one or more of the following: a coating formulation that is stable over time towards phase separation and gelation, a coating formulation that wets and cures on a wide variety of substrates, and a coating formulation that may be manufactured using non-toxic components using a chemistry that generates little waste.

Additional advantages of the embodiments will be set forth in part in the description which follows, and in part will be understood from the description, or may be learned by practice of the embodiments. The advantages will be realized and attained by means of the elements and combinations particularly pointed out in the appended claims.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this specification, illustrate embodiments of the present teachings and together with the description, serve to explain the principles of the disclosure.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

The following embodiments are described for illustrative purposes only with reference to the Figures. Those of skill in the art will appreciate that the following description is exemplary in nature, and that various modifications to the parameters set forth herein could be made without departing from the scope of the present embodiments. It is intended that the specification and examples be considered as examples only. The various embodiments are not necessarily mutually exclusive, as some embodiments can be combined with one or more other embodiments to form new embodiments.

As used herein, unless otherwise specified, the word "printer" encompasses any apparatus that performs a print outputting function for any purpose, such as a digital copier, bookmaking machine, facsimile machine, a multi-function machine, electrostatographic device, etc.

It will be understood that the structures depicted in the figures may include additional features not depicted for simplicity, while depicted structures may be removed or modified.

Figure 1:
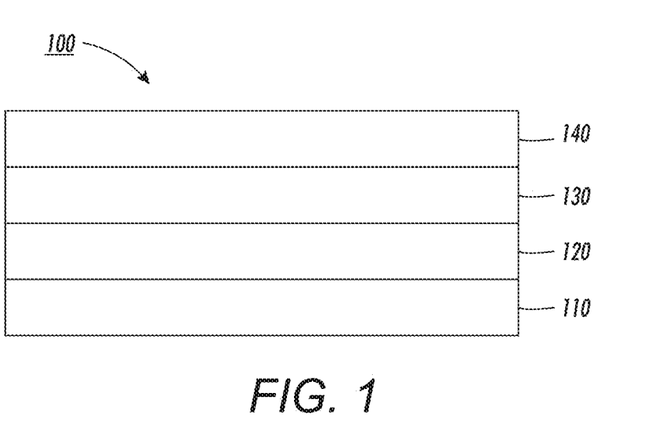
FIG. 1 depicts a schematic cross-sectional view of an illustrative transfix blanket for a printer, according to one or more embodiments.

FIG. 1 depicts a schematic cross-sectional view of an illustrative transfix blanket 100 for a printer (e.g., an indirect aqueous inkjet printer), according to one or more embodiments disclosed. The blanket 100 may include a first or substrate layer 110. The substrate layer 110 may be made from or include polyimide, aluminum, woven fabric, or combinations thereof.

A second or conformance layer 120 may be disposed at least partially on and/or over the substrate layer 110. The conformance layer 120 may have a depth or thickness 122 ranging from about 500 µm to about 7000 µm, about 1000 µm to about 5000 µm, or about 2000 µm to about 4000 µm. The conformance layer 120 may be made from a composite material. More particularly, the conformance layer 120 may be made from or include a polymer matrix. The polymer matrix may be or include silicone, a cross-linked silane, or a combination thereof.

The conformance layer 120 may also include one or more filler materials such as silica, alumina, iron oxide, carbon black, or a combination thereof. The filler materials may be present in the conformance layer 120 in an amount ranging from about 0.1 wt % to about 20 wt %, about 1 wt % to about 15 wt %, or about 2 wt % to about 10 wt %.

A third or tiecoat/adhesive layer 130 may be disposed at least partially on and/or over the conformance layer 120. The adhesive layer 130 may have a depth or thickness 132 ranging from about 0.05 µm to about 10 µm, about 0.25 µm to about 5 µm, or about 0.5 µm to about 2 µm. The adhesive layer 130 may be made from a silane, an epoxy silane, an amino silane adhesive, or a combination thereof. In another embodiment, the adhesive layer 130 may be made from a composite material. More particularly, the adhesive layer 130 may be made from or include a polymer matrix. The polymer matrix may be or include silicone, a cross-linked silane, or a combination thereof.

A fourth or topcoat layer 140 may be disposed at least partially on and/or over the adhesive layer 130. The topcoat layer 140 may have a depth or thickness 142 ranging from about 500 nm to about 200 µm, about 1 µm to about 150 µm, or about 5 µm to about 100 µm. The topcoat layer 140 may be made from a silanol terminated copolymer crosslinked with at least one cross-linker. In an example, the topcoat layer 140 may be formed from a liquid composition that is cured. In an example, the liquid composition may include the silanol terminated copolymer, and at least one cross-linker. The at least one cross-linker may be one or more selected from the group consisting of a trialkoxysilane terminated polydialkylsiloxane and one or more of a trialkoxysilyl terminated polymer.

The liquid composition may further include a catalyst comprising about 0.1 wt % to about 5 wt % of the composition and selected from at least one in the group consisting of titanate, zirconate and tin. The liquid composition may be formed over a substrate, such as substrate layer 110, and then cured to form the coating. For example, the liquid composition may be cured at a temperature in the range of about 80° C. to about 150° C., such as about 90° C. to about 130° C., such as about 100° C. to about 120° C., for a time in the range of between about 10 minutes to about 90 minutes, such as about 30 minutes to about 70 minutes, such as about 40 minutes to about 60 minutes.

In an example, the silanol terminated copolymer may comprise from about 10 mol % to about 25 mol %, from about 15 mol % to about 25 mol %, or from about 15 to about 20 mol % of a diphenylsiloxane repeat unit. The silanol terminated copolymer may comprise greater than about 50 mol %, greater than about 60 mol % or greater than about 70 mol % of a dialkylsiloxane repeat unit.

The silanol terminated siloxane copolymer may comprise a molecular weight of between about 500 g/mol and about 50,000, g/mol, for example 500 g/mol and about 5000 g/mol, and may be represented by:

where R is a linear, branched, or cyclic saturated or unsaturated alkyl group containing from about 1 to 30 carbon atoms and s is from about 1 to about 500 and t is from about 1 to about 300.

In an example, the trialkoxysilane terminated polydialkylsiloxane may represented by wherein R is a linear, branched, or cyclic saturated or unsaturated alkyl group containing from about 1 to 30 carbon atoms, R' is a hydrogen atom or a linear, branched, or cyclic saturated or unsaturated alkyl group containing from about 1 to 30 carbon atoms, n is from about 0 to about 50 and q is from about 1 to about 500, from about 1 to about 200, or from about 1 to about 100.

In an example, the one or more trialkoxysilyl terminated polymer may represented by formulae I or II:

where $L^1$, $L^2$ and $L^3$ may be linker groups, such as, for example $C_1$ to $C_6$ alkyl bridge groups. $X^1$, $X^2$, $X^3$, $X^4$, $X^5$, $X^6$, $X^7$, $X^8$ and $X^9$ may be independently selected from the group consisting of a hydroxyl, a reactive alkoxide functionality and an unreactive aliphatic functionality. $R^1$ and $R^2$ may be independently selected from the group consisting of: a) a linear, branched or cyclic, saturated or unsaturated alkyl group, b) a perfluorinated linear, branched or cyclic carbon chain, c) a group having one or more dialkylsiloxane units, d) a substituted or unsubstituted polyether group optionally comprising one or more amide moieties, carbonyl moieties, carboxylic acid ester moieties or amine moieties, and e) a polyamine group optionally comprising a saturated hydrocarbon chain moiety.

The one or more trialkoxysilyl terminated polymer may be a trialkoxysilyl terminated polymer represented by formula (I) and may be a bis-trialkoxysilyl terminated polymer. With respect to a bis-trialkoxysilyl terminated polymer represented by formula (I), suitable $R^1$ moieties may include, but are not limited to, the following:

where a is an integer ranging from 0 to about 30, n is an integer ranging from 0 to 50, and x is an integer ranging from 0 to 30.

The one or more trialkoxysilyl terminated polymer may be a trialkoxysilyl terminated polymer represented by formula (II). With respect to the trialkoxysilyl terminated polymer represented by formula (II), suitable $R^2$ moieties may include, but are not limited to, the following:

where a is an integer ranging from 0 to about 30, m and n are integers ranging from 0 to 50, and x is an integer ranging from 0 to 30.

In an example, the one or more of a trialkoxysilyl terminated polymer includes a first trialkoxysilyl terminated polymer, a second trialkoxysilyl terminated polymer and a third trialkoxysilyl terminated polymer. In an example, the one or more of a trialkoxysilyl terminated polymer can further include a fourth trialkoxysilyl terminated polymer, a fifth trialkoxysilyl terminated polymer and/or a sixth trialkoxysilyl terminated polymer. The first, second, third, fourth, fifth and sixth trialkoxysilyl terminated polymer may each be a different trialkoxysilyl terminated polymer. That is, in the case of more than one trialkoxysilyl terminated polymer, each trialkoxysilyl terminated polymer may have a different structure. In other words, in a liquid composition there may be from 1 trialkoxysilyl terminated polymer to 6 trialkoxysilyl terminated polymers, each having a different structure, or from 1 trialkoxysilyl terminated polymer to 4 trialkoxysilyl terminated polymers, each having a different structure, or from 1 trialkoxysilyl terminated polymer to 3 trialkoxysilyl terminated polymers, each having a different structure. Additionally, by appropriate selection of values for a, n, m, and x in the $R^1$ and $R^2$ moieties described above, formulae (I) and (II) may represent trialkoxysilyl terminated monomers or oligomers, and such monomers and/or oligomers may be used instead of or in addition to the one or more trialkoxysilyl terminated polymer in the liquid composition.

The liquid composition may further include one or more of a solvent. The solvent may include one or more selected from organic hydrocarbon solvents, alcohols such as methanol, ethanol, isopropanol, and n-butanol and fluorinated solvents. Further examples of solvents include, but are not limited to, ketones such as methyl ethyl ketone, and methyl isobutyl ketone, and cyclohexanone. Mixtures of solvents may be used. In embodiments, the solvent may be a ketone solvent. In embodiments, the ketone solvent may be present in an amount of at least 1 weight percent of the formulation composition, such as from about 1 weight percent to about 60 weight percent, such as from about 3 weight percent to about 40 weight percent, or from about 5 weight percent to about 20 weight percent of the formulation composition.

Upon curing the liquid composition to form a coating, the coating may be polished to expose portions that are more hydrophilic than an upper surface thereof. For example, about 1.5 mm of the coating may be polished to expose the polar functional groups and provide a more wettable surface. While not limited to any particular theory it is believed that by exposing polar functional groups below the surface of the cured coatings, a surface free energy is increased.

Figure 2:
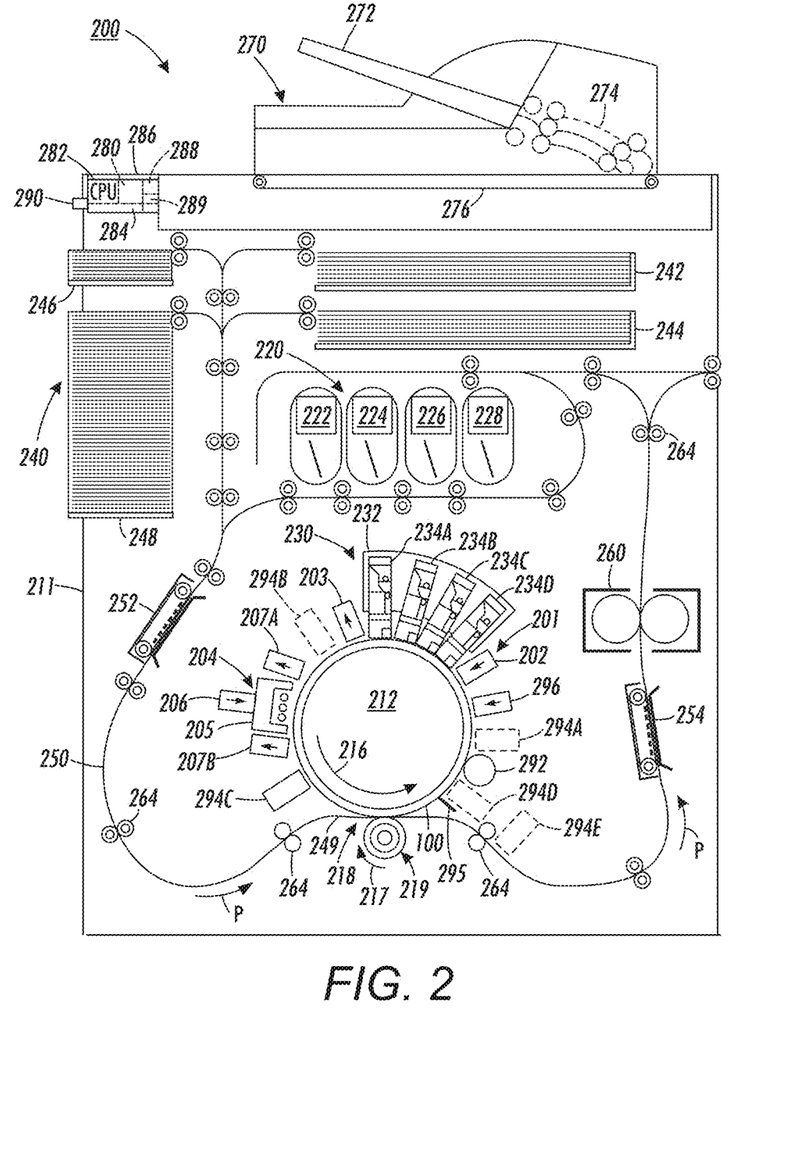
FIG. 2 depicts an illustrative printer including the transfix blanket, according to one or more embodiments.

FIG. 2 depicts an illustrative printer 200 including the transfix blanket 100, according to one or more embodiments disclosed. The printer 200 may be an indirect aqueous inkjet printer that forms an ink image on a surface of the blanket 100. The blanket 100 may be mounted about an intermediate rotating member 212. The ink image may be transferred from the blanket 100 to media passing through a nip 218 formed between the blanket 100 and a transfix roller 219.

A print cycle is now described with reference to the printer 200. A "print cycle" refers to operations of the printer 200 including, but not limited to, preparing an imaging surface for printing, ejecting ink onto the imaging surface, treating the ink on the imaging surface to stabilize and prepare the image for transfer to media, and transferring the image from the imaging surface to the media.

The printer 200 may include a frame 211 that supports operating subsystems and components, which are described below. The printer 200 may also include an intermediate transfer member, which is illustrated as a rotating imaging drum 212. The imaging drum 212 may have the blanket 100 mounted about the circumference of the drum 212. The blanket 100 may move in a direction 216 as the member 212 rotates. The transfix roller 219 may rotate in the direction 217 and be loaded against the surface of blanket 100 to form the transfix nip 218, within which ink images formed on the surface of blanket 100 are transfixed onto a print medium 249. In some embodiments, a heater in the drum 212 or in another location of the printer heats the blanket 100 to a temperature in a range of, for example, approximately 50° C. to approximately 70° C. The elevated temperature promotes partial drying of the liquid carrier that is used to deposit the hydrophilic composition and the water in the aqueous ink drops that are deposited on the blanket 100.

A surface maintenance unit ("SMU") 292 may remove residual ink left on the surface of the blanket 100 after the ink images are transferred to the print medium 249. The SMU 292 may include a coating applicator, such as a donor roller (not shown), which is partially submerged in a reservoir (not shown) that holds a hydrophilic polyurethane coating composition in a liquid carrier. The donor roller may rotate in response to the movement of the blanket 100 in the process direction. The donor roller may draw the liquid polyurethane composition from the reservoir and deposit a layer of the polyurethane composition on the blanket 100. As described below, the polyurethane composition may be deposited as a uniform layer having any desired thickness. After a drying process, the dried polyurethane coating may substantially cover a surface of the blanket 100 before the printer 200 ejects ink drops during a print process. The SMU 292 may be operatively connected to a controller 280, described in more detail below, to enable the controller 280 to operate the donor roller, as well as a metering blade and a cleaning blade to deposit and distribute the coating material onto the surface of the blanket 100 and to remove un-transferred ink and any polyurethane residue from the surface of the blanket 100.

The printer 200 may also include a dryer 296 that emits heat and optionally directs an air flow toward the polyurethane composition that is applied to the blanket 100. The dryer 296 may facilitate the evaporation of at least a portion of the liquid carrier from the polyurethane composition to leave a dried layer on the blanket 100 before the intermediate transfer member passes one or more printhead modules 234A-234D to receive the aqueous printed image.

The printer 200 may also include an optical sensor 294A, also known as an image-on-drum ("IOD") sensor, which is configured to detect light reflected from the blanket 100 and the polyurethane coating applied to the blanket 100 as the member 212 rotates past the sensor. The optical sensor 294A includes a linear array of individual optical detectors that are arranged in the cross-process direction across the blanket 100. The optical sensor 294A generates digital image data corresponding to light that is reflected from the blanket 100 and the polyurethane coating. The optical sensor 294A generates a series of rows of image data, which are referred to as "scanlines," as the intermediate transfer member 212 rotates the blanket 100 in the direction 216 past the optical sensor 294A. In at least one embodiment, each optical detector in the optical sensor 294A may include three sensing elements that are sensitive to wavelengths of light corresponding to red, green, and blue (RGB) reflected light colors. In another embodiment, the optical sensor 294A may include illumination sources that shine red, green, and blue light. In yet another embodiment, the sensor 294A may have an illumination source that shines white light onto the surface of blanket 100, and white light detectors are used.

The optical sensor 294A may shine complementary colors of light onto the image receiving surface to enable detection of different ink colors using the photodetectors. The image data generated by the optical sensor 294A may be analyzed by the controller 280 or other processor in the printer 200 to identify the thickness of the polyurethane coating on the blanket 100. The thickness and coverage may be identified from either specular or diffuse light reflection from the blanket 100 and/or the coating. Other optical sensors 294B, 294C, and 294D may be similarly configured and located in different locations around the blanket 100 to identify and evaluate other parameters in the printing process, such as missing or inoperative inkjets and ink image formation prior to image drying (294B), ink image treatment for image transfer (294C), and the efficiency of the ink image transfer (294D). Alternatively, some embodiments may include an optical sensor to generate additional data that may be used for evaluation of the image quality on the media (294E).

The printer 200 may include an airflow management system 201, which generates and controls a flow of air through the print zone. The airflow management system 201 may include a printhead air supply 202 and a printhead air return 203. The printhead air supply 202 and return 203 may be operatively connected to the controller 280 or some other processor in the printer 200 to enable the controller to manage the air flowing through the print zone. This regulation of the air flow may be through the print zone as a whole or about one or more printhead arrays. The regulation of the air flow may help to prevent evaporated solvents and water in the ink from condensing on the printhead and as well as attenuating heat in the print zone to reduce the likelihood that ink dries in the inkjets, which may clog the inkjets. The airflow management system 201 may also include one or more sensors to detect humidity and temperature in the print zone to enable more precise control of the temperature, flow, and humidity of the air supply 202 and return 203 to ensure optimum conditions within the print zone.

The printer 200 may also include an aqueous ink supply and delivery subsystem 220 that has at least one source 222 of one color of aqueous ink. Since the printer 200 is a multicolor image producing machine, the ink delivery system 220 includes, for example, four (4) sources 222, 224, 226, 228, representing four (4) different colors CYMK (cyan, yellow, magenta, black) of aqueous inks.

The printhead system 230 may include a printhead support 232, which provides support for a plurality of printhead modules, also known as print box units, 234A-234D. Each printhead module 234A-234D effectively extends across the width of the blanket 100 and ejects ink drops onto the blanket 100. A printhead module 234A-234D may include a single printhead or a plurality of printheads configured in a staggered arrangement. Each printhead module 234A-234D may be operatively connected to a frame (not shown) and aligned to eject the ink drops to form an ink image on the coating on the blanket 100. The printhead modules 234A-234D may include associated electronics, ink reservoirs, and ink conduits to supply ink to the one or more printheads. One or more conduits (not shown) may operatively connect the sources 222, 224, 226, and 228 to the printhead modules 234A-234D to provide a supply of ink to the one or more printheads in the modules 234A-234D. As is generally familiar, each of the one or more printheads in a printhead module 234A-234D may eject a single color of ink. In other embodiments, the printheads may be configured to eject two or more colors of ink. For example, printheads in modules 234A and 234B may eject cyan and magenta ink, while printheads in modules 234C and 234D may eject yellow and black ink. The printheads in the illustrated modules 234A-234D are arranged in two arrays that are offset, or staggered, with respect to one another to increase the resolution of each color separation printed by a module. Such an arrangement enables printing at twice the resolution of a printing system only having a single array of printheads that eject only one color of ink. Although the printer 200 includes four printhead modules 234A-234D, each of which has two arrays of printheads, alternative configurations include a different number of printhead modules or arrays within a module.

After the printed image on the blanket 100 exits the print zone, the image passes under an image dryer 204. The image dryer 204 may include a heater, such as a radiant infrared heater, a radiant near infrared heater, and/or a forced hot air convection heater 205. The image dryer 204 may also include a dryer 206, which is illustrated as a heated air source, and air returns 207A and 207B. The infrared heater 205 may apply infrared heat to the printed image on the surface of the blanket 100 to evaporate water or solvent in the ink. The heated air source 206 may direct heated air over the ink to supplement the evaporation of the water or solvent from the ink. In at least one embodiment, the dryer 206 may be a heated air source with the same design as the dryer 296. While the dryer 206 may be positioned along the process direction to dry the hydrophilic composition, the dryer 206 may also be positioned along the process direction after the printhead modules 234A-234D to at least partially dry the aqueous ink on the blanket 100. The air may then be collected and evacuated by air returns 207A and 207B to reduce the interference of the air flow with other components in the printing area.

The printer 200 may further include a print medium supply and handling system 240 that stores, for example, one or more stacks of paper print mediums of various sizes. The print medium supply and handling system 240, for example, includes sheet or substrate supply sources 242, 244, 246, and 248. The supply source 248 may be a high capacity paper supply or feeder for storing and supplying image receiving substrates in the form of cut print mediums 249. The print medium supply and handling system 240 may also include a substrate handling and transport system 250 that has a media pre-conditioner assembly 252 and a media post-conditioner assembly 254. The printer 200 may also include a fusing device 260 to apply additional heat and pressure to the print medium after the print medium passes through the transfix nip 218. The printer 200 may also include an original document feeder 270 that has a document holding tray 272, document sheet feeding and retrieval devices 274, and a document exposure and scanning system 276.

Operation and control of the various subsystems, components, and functions of the printer 200 may be performed with the aid of the controller 280. The controller 80 may be operably connected to the intermediate transfer member 212, the printhead modules 234A-234D (and thus the printheads), the substrate supply and handling system 240, the substrate handling and transport system 250, and, in some embodiments, the one or more optical sensors 294A-294E. The controller 280 may be a self-contained, dedicated mini-computer having a central processor unit ("CPU") 282 with electronic storage 284, and a display or user interface ("UI") 286. The controller 280 may include a sensor input and control circuit 288 as well as a pixel placement and control circuit 289. In addition, the CPU 282 may read, capture, prepare, and manage the image data flow between image input sources, such as the scanning system 276, or an online or a work station connection 290, and the printhead modules 234A-234D. As such, the controller 280 may be the main multi-tasking processor for operating and controlling all of the other machine subsystems and functions.

Once an image or images have been formed on the blanket 100 and coating under control of the controller 280, the printer 200 may operate components within the printer 200 to perform a process for transferring and fixing the image or images from the blanket 100 to media. The controller 280 may operate actuators to drive one or more of the rollers 264 in the media transport system 250 to move the print medium 249 in the process direction P to a position adjacent the transfix roller 219 and then through the transfix nip 218 between the transfix roller 219 and the blanket 100. The transfix roller 219 may apply pressure against the back side of the print medium 249 in order to press the front side of the print medium 249 against the blanket 100 and the intermediate transfer member 212. Although the transfix roller 219 may also be heated, as shown, the transfix roller 219 is unheated in FIG. 2. The pre-heater assembly 252 for the print medium 249 may be in the media path leading to the transfix nip 218. The pre-conditioner assembly 252 may condition the print medium 249 to a predetermined temperature that aids in the transferring of the image to the media, thus simplifying the design of the transfix roller 219. The pressure produced by the transfix roller 219 on the back side of the heated print medium 249 may facilitate the transfixing (transfer and fusing) of the image from the intermediate transfer member 212 onto the print medium 249. The rotation or rolling of both the intermediate transfer member 212 and transfix roller 219 not only transfixes the images onto the print medium 249, but also assists in transporting the print medium 249 through the transfix nip 218. The intermediate transfer member 212 may continue to rotate to enable the printing process to be repeated.

After the intermediate transfer member moves through the transfix nip 218, the image receiving surface passes a cleaning unit that removes residual portions of the sacrificial polyurethane coating and small amounts of residual ink from the image receiving surface of the blanket 100. In the printer 200, the cleaning unit is embodied as a cleaning blade 295 that engages the surface of the blanket 100. The blade 295 is formed from a material that wipes the surface of the blanket 100 without causing damage to the blanket 100. For example, the cleaning blade 295 may be formed from a flexible polymer material in the printer 200. In another embodiment, the cleaning unit may include a roller or other member that applies a mixture of water and detergent to remove residual materials from the surface of the blanket 100 after the intermediate transfer member moves through the transfix nip 218. The term "detergent" or cleaning agent refers to any surfactant, solvent, or other chemical compound that is suitable for removing any sacrificial polyurethane coating and any residual ink from the image receiving surface of the blanket 100.

The following examples are presented for illustrative purposes and are not intended to limit the scope of the disclosure.

Example 1

Figure 3:
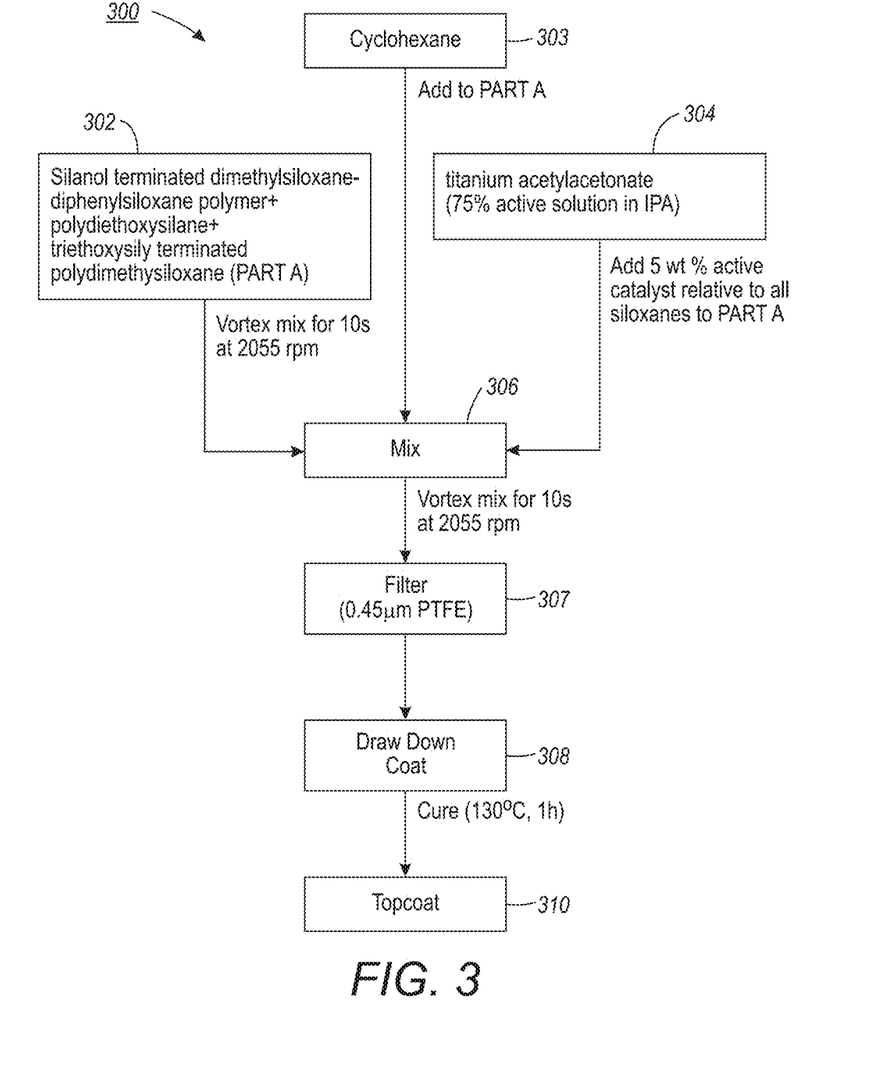
FIG. 3 depicts a schematic flowchart for forming an illustrative topcoat layer of a transfix blanket, according to one or more embodiments.

FIG. 3 depicts a schematic flowchart 300 for forming an illustrative coating, such as topcoat layer 140 of a transfix blanket 100, according to one or more embodiments. More particularly, the flowchart 300 describes the formulation and drawdown coating of a silanol terminated copolymer which is cured and crosslinked to at least one crosslinker.

To form Part A, Silanol terminated dimethylsiloxane-diphenylsiloxane copolymer (3.92 g; available from Gelest, Inc., Morrisville, Pa.), polydiethoxysilane (1.31 g, available from Gelest, Inc., Morrisville, Pa.) and triethoxysilyl terminated polydimethylsiloxane (1.31 g, available from Gelest, Inc., Morrisville, Pa.) are combined in a vial and mixed by vortex for 10 s at 2500 rpm as shown in 302. Cyclohexanone (0.25 g) is added to the vial as shown in 303, followed by addition of titanium acetylacetonate (0.44 g of a 75% active solution in IPA; 5 wt % active catalyst relative to all siloxanes; available from Sigma-Aldrich Co., LLC, St. Louis, Mo.) as shown in 304. The solution is mixed by vortex for 10 s at 2500 rpm as shown in 306. The coating solution is filtered through a 0.45 μm PTFE filter immediately prior to coating to remove any particulates as shown in 307. The coating solution is draw down coated on polyimide or aluminum or silicone or Mylar substrates or cast onto quartz yielding uniform coatings as shown in 308. The coating solution formed a stable wet layer on all substrates tested. The coatings are cured at 130° C. for 1 hour as shown in 310, yielding clear, uniform films.

Example 2

Silanol terminated dimethylsiloxane-diphenylsiloxane copolymer (1.52 g), triethoxysilylethyl terminated polydimethylsiloxane (0.57 g), N,N'-bis-[(3-triethoxysilylpropyl)aminocarbonyl]polyethylene oxide (10-15 EO) (0.37 g), and 3-(trimethoxysilylpropyl)diethylenetriamine (0.57 g) are combined in a vial and mixed by vortex for 10 s at 2500 rpm. Cyclohexanone (0.27 g) is added to the vial, followed by titanium acetylacetonate (0.20 g of a 75% active solution in IPA; 5 wt % active catalyst relative to all siloxanes). The solution is mixed by vortex for 10 s at 2500 rpm. The coating solution is filtered through a 0.45 μm PTFE filter immediately prior to coating to remove any particulates. The coating solution is draw down coated on polyimide or aluminum or silicone or Mylar substrates or cast onto quartz yielding uniform coatings. The coating solution formed a stable wet layer on all substrates tested. The coatings are cured at 90° C. with ~50% relative humidity for 1 h to give clear, uniform films.

Example 3

Silanol terminated dimethylsiloxane-diphenylsiloxane copolymer (1.12 g), N,N'-bis-[(3-triethoxysilylpropyl)aminocarbonyl]polyethylene oxide (10-15 EO) (0.37 g), and 3-(trimethoxysilylpropyl)diethylenetriamine (0.60 g) are combined in a vial and mixed by vortex for 10 s at 2500 rpm. Cyclohexanone (0.33 g) is added to the vial, followed by titanium acetylacetonate (0.14 g of a 75% active solution in IPA; 5 wt % active catalyst relative to all siloxanes). The solution is mixed by vortex for 10 s at 2500 rpm. The coating solution is filtered through a 0.45 μm PTFE filter immediately prior to coating to remove any particulates. The coating solution is draw down coated on polyimide or aluminum or silicone or Mylar substrates or cast onto quartz yielding uniform coatings. The coating solution formed a stable wet layer on all substrates tested. The coatings are cured at 90° C. with ~50% relative humidity for 1 h to give clear, uniform films.

Example 4

Silanol terminated dimethylsiloxane-diphenylsiloxane copolymer (1.51 g), triethoxysilylethyl terminated polydimethylsiloxane (0.57 g), 2-(acetoxy(polyethyleneoxy)propyl)triethoxysilane (0.37 g), and 3-(trimethoxysilylpropyl)diethylenetriamine (0.60 g) are combined in a vial and mixed by vortex for 10 s at 2500 rpm. Cyclohexanone (0.26 g) is added to the vial, followed by titanium acetylacetonate (0.21 g of a 75% active solution in IPA; 5 wt % active catalyst relative to all siloxanes). The solution is mixed by vortex for 10 s at 2500 rpm. The coating solution is filtered through a 0.45 μm PTFE filter immediately prior to coating to remove any particulates. The coating solution is drawdown coated on polyimide or aluminum or silicone or Mylar substrates or cast onto quartz yielding uniform coatings. The coating solution formed a stable wet layer on all substrates tested. The coatings are cured at 90° C. with ~50% relative humidity for 1 h to give clear, uniform films.

Example 5

Exposing an Active Surface for Improved Wetting

Dry Sanding—Removing Bulk of Material

The coating is cleaned with isopropyl alcohol and the substrate is affixed to a hard surface with double sided tape. Lapping film (9 μm) is attached to a sanding block and the coating is sanded using moderate pressure in a circular motion for ~1 min to remove 1-3 μm of material. After removing the desired amount of material excess dust is blown from the coating with compressed air.

Wet Polish—Removing Roughness Introduced During Dry Process

Colloidal alumina suspension (0.05 □m particles Allied High Tech Products) is applied to the film and a polishing cloth (Allied High Tech Products, Chem-Pol adhesive backed polishing cloth) is used to vigorously rub the colloidal material in a circular motion for ~5 min. The coating is rinsed repeatedly with de-ionized water and dried at 55° C. for 1 h. Polishing with colloidal alumina removed the larger surface roughness features.

Example 6

Examining the Surface Free Energy of the Coated Surface

Figure 4:
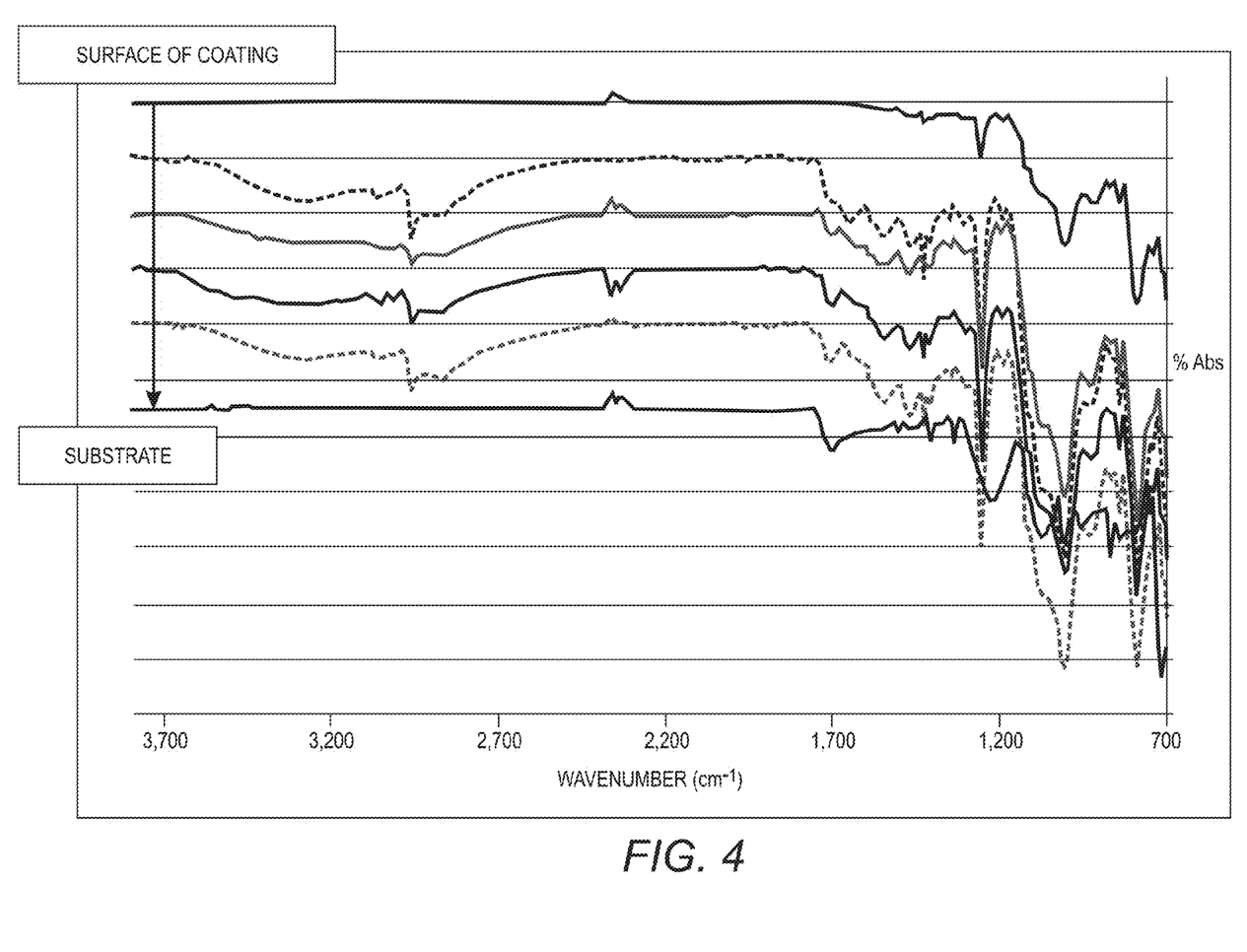
FIG. 4 is an ATR-IR spectrum of an exemplary coating formed on a substrate.

When examining the surface free energy of the coated surface it is observed that despite the inclusion of polar functional groups (esters, amines, amides) in the material forming the coating, the surface free energy and subsequent wettability of the surface does not necessarily show substantial increase. However, depth profiling of the material by Attenuated Total Reflectance-Infrared (ATR) in conjunction with infrared spectroscopy (ATR-IR spectroscopy) reveals a 'skinning' effect. That is, the polar functional groups are not present at the surface. Sanding and polishing away as little as 1.5 μm of material exposes the polar functional groups and gives rise to a more wettable surface (increased SFE). Further polishing revealed the composition of the bulk is homogeneous as the OH and NH stretching between 3,000-3,500 cm$^{-1}$ are observed in similar intensity throughout the bulk of the coating (FIG. 4). Accordingly, the surface polishing step described in Example 5 enables exposure of a more hydrophilic portions of the coating relative to the surface of the coating which allows for improved wetting.

While the embodiments have been illustrated respect to one or more implementations, alterations and/or modifications can be made to the illustrated examples without departing from the spirit and scope of the appended claims. In addition, while a particular feature of the embodiments may have been disclosed with respect to only one of several implementations, such feature may be combined with one or more other features of the other implementations as may be desired and advantageous for any given or particular function.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other embodiments will be apparent to those skilled in the art from consideration of the specification and practice of the descriptions disclosed herein. It is intended that the specification and examples be considered as exemplary only, with a true scope and spirit of the embodiments being indicated by the following claims.

What is claimed is:

1. A coating method, comprising:
forming a liquid coating composition on a substrate; and
forming a cured coating by curing the liquid coating composition at a temperature in the range of 80° C. to about 150° C.,
wherein the liquid coating composition comprises:
a silanol terminated copolymer comprising from about 10 to about 25 mol % of a diphenylsiloxane repeat unit and greater than about 50 mol % of a dialkylsiloxane repeat unit;
at least one cross-linker; and
a catalyst comprising about 0.1 wt % to about 5 wt % of the liquid coating composition and selected from at least one in the group consisting of titanate, zirconate and tin;
wherein the silanol terminated siloxane copolymer is represented by:

where R is a linear, branched, or cyclic saturated or unsaturated alkyl group containing from about 1 to 30 carbon atoms, wherein s and t are integers and are selected such that the silanol terminated copolymer comprises from about 10 to about 25 mol % of the diphenylsiloxane repeat unit and greater than about 50 mol % of the dialkylsiloxane repeat unit, wherein s falls within the range of from about 1 to about 500 and t falls within the range of from about 1 to about 300, and
wherein the at least one crosslinker comprises tetraethoxysilane (TEOS) and one or more trialkoxysilyl terminated polymer.

2. The method of claim 1, further comprising, polishing the cured coating to expose portions that are more hydrophilic than an upper surface of the cured coating.

3. The method of claim 1, wherein the at least one crosslinker further comprises a trialkoxysilane terminated polydialkylsiloxane, wherein the trialkoxysilane terminated polydialkylsiloxane is represented by wherein R is a linear, branched, or cyclic saturated or unsaturated alkyl group containing from about 1 to 30 carbon atoms, R' is a hydrogen atom or a linear, branched, or cyclic saturated or unsaturated alkyl group containing from about 1 to 30 carbon atoms, n is from about 0 to about 50 and q is from about 1 to about 500.

4. The method of claim 1, wherein the one or more trialkoxysilyl terminated polymer is represented by formulae I or II:

where,

$L^1$, $L^2$ and $L^3$ are linker groups comprising $C_1$ to $C_6$ alkyl bridge groups; $X^1$, $X^2$, $X^3$, $X^4$, $X^5$, $X^6$, $X^7$, $X^8$ and $X^9$ are independently selected from the group consisting of a hydroxyl, a reactive alkoxide functionality and an unreactive aliphatic functionality; and $R^1$ and $R^2$ are independently selected from the group consisting of: a) a linear, branched or cyclic, saturated or unsaturated alkyl group, b) a perfluorinated linear, branched or cyclic carbon chain, c) a group having one or more dialkylsiloxane units, d) a substituted or unsubstituted polyether group optionally comprising one or more amide moieties, carbonyl moieties, carboxylic acid ester moieties or amine moieties, and e) a polyamine group optionally comprising a saturated hydrocarbon chain moiety.

5. The method of claim 4, wherein the one or more trialkoxysilyl terminated polymer comprises at least one of a first trialkoxysilyl terminated polymer, a second trialkoxysilyl terminated polymer and a third trialkoxysilyl terminated polymer, wherein each of the first second and third trialkoxysilyl terminated polymers have different structures.

6. A coating method, comprising:
forming a liquid coating composition on a substrate; and
forming a cured coating by curing the liquid coating composition at a temperature in the range of 80° C. to about 150° C.,
wherein the liquid coating composition comprises:
a silanol terminated copolymer comprising from about 10 to about 25 mol % of a diphenylsiloxane repeat unit and greater than about 50 mol % of a dialkylsiloxane repeat unit;
at least one cross-linker; and
a catalyst comprising about 0.1 wt % to about 5 wt % of the liquid coating composition and selected from at least one in the group consisting of titanate, zirconate and tin;

wherein the silanol terminated siloxane copolymer is represented by:

where R is a linear, branched, or cyclic saturated or unsaturated alkyl group containing from about 1 to 30 carbon atoms, wherein s and t are integers and are selected such that the silanol terminated copolymer comprises from about 10 to about 25 mol % of the diphenylsiloxane repeat unit and greater than about 50 mol % of the dialkylsiloxane repeat unit, wherein s falls within the range of from about 1 to about 500 and t falls within the range of from about 1 to about 300, wherein the at least one crosslinker comprises at least one selected from the group consisting of tetraethoxysilane (TEOS), a trialkoxysilane terminated polydialkylsiloxane and one or more trialkoxysilyl terminated polymer, wherein the one or more trialkoxysilyl terminated polymer is represented by formulae I or II:

where, $L^1$, $L^2$ and $L^3$ are linker groups comprising $C_1$ to $C_6$ alkyl bridge groups; $X^1$, $X^2$, $X^3$, $X^4$, $X^5$, $X^6$, $X^7$, $X^8$ and $X^9$ are independently selected from the group consisting of a hydroxyl, a reactive alkoxide functionality and an unreactive aliphatic functionality; and $R^1$ and $R^2$ are independently selected from the group consisting of: a) a linear, branched or cyclic, saturated or unsaturated alkyl group, b) a perfluorinated linear, branched or cyclic carbon chain, c) a group having one or more dialkylsiloxane units, d) a substituted or unsubstituted polyether group optionally comprising one or more amide moieties, carbonyl moieties, carboxylic acid ester moieties or amine moieties, and e) a polyamine group optionally comprising a saturated hydrocarbon chain moiety, and wherein the at least one crosslinker comprises TEOS and at least one of a first trialkoxysilyl terminated polymer, a second trialkoxysilyl terminated polymer, a third trialkoxysilyl terminated polymer, a fourth trialkoxysilyl terminated polymer, a fifth trialkoxysilyl terminated polymer, and a sixth trialkoxysilyl terminated polymer, wherein each of the first, second, third, fourth, fifth and sixth trialkoxysilyl terminated polymers have different structures.

7. The method of claim 1, wherein the liquid coating composition further comprises at least one solvent.

* * * * *